US011804799B2

(12) United States Patent
Pramod et al.

(10) Patent No.: US 11,804,799 B2
(45) Date of Patent: Oct. 31, 2023

(54) DETECTION OF UNBALANCED PHASE RESISTANCES IN SYNCHRONOUS MOTOR DRIVES

(71) Applicant: Steering Solutions IP Holding Corporation, Saginaw, MI (US)

(72) Inventors: Prerit Pramod, Saginaw, MI (US); Rakesh Mitra, Saginaw, MI (US); Darren Qu, Saginaw, MI (US); Subhra Paul, Saginaw, MI (US); Julie A. Kleinau, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 197 days.

(21) Appl. No.: 16/836,822

(22) Filed: Mar. 31, 2020

(65) Prior Publication Data

US 2021/0305929 A1    Sep. 30, 2021

(51) Int. Cl.
*H02P 29/024* (2016.01)
*B62D 5/04* (2006.01)
*H02P 6/185* (2016.01)

(52) U.S. Cl.
CPC .......... *H02P 29/0243* (2016.02); *B62D 5/046* (2013.01); *H02P 6/185* (2013.01)

(58) Field of Classification Search
CPC ....... A61B 8/0841; A61B 8/52; A61B 8/5207; A61B 8/5223; A61B 8/5246; A61B 8/5269; A61B 8/56; G16H 50/30; B62D 5/046; H02P 29/0243; H02P 29/64
USPC ..................................................... 318/400.21
See application file for complete search history.

(56) References Cited

U.S. PATENT DOCUMENTS

| | | | | |
|---|---|---|---|---|
| 4,535,276 A | * | 8/1985 | Yokobori | G05F 1/561 318/400.27 |
| 6,426,602 B1 | * | 7/2002 | McCann | B62D 5/046 318/284 |
| 2006/0176059 A1 | * | 8/2006 | Mir | G01R 31/343 324/503 |
| 2007/0236165 A1 | * | 10/2007 | Ritschel | H02P 25/024 318/700 |
| 2018/0351496 A1 | * | 12/2018 | Vaks | F28F 27/00 |
| 2020/0287492 A1 | * | 9/2020 | Sega | H02P 6/185 |
| 2021/0365123 A1 | * | 11/2021 | Bajaj | G08B 6/00 |

FOREIGN PATENT DOCUMENTS

WO    WO-2020121183 A1 *  6/2020  ............. F04B 35/04

* cited by examiner

*Primary Examiner* — Bickey Dhakal
*Assistant Examiner* — Zemenay T Truneh
(74) *Attorney, Agent, or Firm* — Dickinson Wright PLLC (57) ABSTRACT

A system for controlling a synchronous motor drive may be configured to receive a command voltage signal and to identify, in the synchronous motor drive, a resistance imbalance signature from the command voltage signal. The system may determine, based on the resistance imbalance signature, respective phase resistances that correspond to phases of a synchronous motor of the synchronous motor drive. Each respective phase resistance may include a phase transistor resistance and a phase winding resistance. The system may identify, based on the phase resistances and an estimated average resistance between the phases of the synchronous motor, one or more phases of the synchronous motor that correspond to one or more phase resistances representing a resistance imbalance.

19 Claims, 6 Drawing Sheets

DETECTION OF UNBALANCED PHASE RESISTANCES IN SYNCHRONOUS MOTOR DRIVES

TECHNICAL FIELD

This disclosure relates to motors and in particular to systems and methods for detection of unbalanced phase resistances in synchronous motor drives.

BACKGROUND OF THE INVENTION

Machines (e.g., vehicles, boats, airplanes, drones, power equipment, yard equipment, pumps, compressors, etc.) utilizing synchronous motors and synchronous motor drives (e.g., permanent magnet synchronous motor (PMSM) drives) may be susceptible to parameter imbalance. Parameter imbalance in a machine utilizing a synchronous motor and a synchronous motor drive (referred to hereafter as a synchronous machine) may, in some cases, cause undesirable current and torque pulsations that lead to sub-optimal current and torque control. Undesirable current and torque pulsations may be magnified in a synchronous motor drive that uses a feedforward current control. In a synchronous motor drive that uses a feedback current control, voltage limitations (e.g., a maximum voltage bus limitation, etc.) and regulation bandwidth may also cause sub-optimal current and torque control.

Typically, synchronous machines are subject to certain requirements and/or regulations. For example, a synchronous machine using high performance motion control applications that are sensitive to noise, vibration, and harshness (e.g., a synchronous machine assisting an electric power steering (EPS) system) may be subject to manufacturing requirements that specify that the synchronous machine satisfy a minimal part-to-part variation. Parameter imbalance in a synchronous motor drive of the synchronous machine may make compliance with the requirements difficult.

SUMMARY OF THE INVENTION

This disclosure relates generally to detection of parameter imbalances in synchronous motor drives.

An aspect of the disclosed embodiments includes a system for controlling a synchronous motor drive. The system includes a processor and a memory. The memory includes instructions that, when executed by the processor, cause the processor to: receive a command voltage signal, identify, in the synchronous motor drive, a resistance imbalance signature from the command voltage signal, determine, based on the resistance imbalance signature, respective phase resistances that correspond to phases of a synchronous motor of the synchronous motor drive, where each respective phase resistance includes a phase transistor resistance and a phase winding resistance, and identify, based on the phase resistances and an estimated average resistance between the phases of the synchronous motor, one or more phases of the synchronous motor that correspond to one or more phase resistances representing a resistance imbalance.

Another aspect of the disclosed embodiments includes a method for detecting a phase resistance imbalance in a synchronous motor drive. The method includes receiving a command voltage signal, identifying, in the synchronous motor drive, a resistance imbalance signature from the command voltage signal, determining, based on the resistance imbalance signature, respective phase resistances that correspond to phases of a synchronous motor of the synchronous motor drive, where each respective phase resistance includes a phase transistor resistance and a phase winding resistance, and identifying, based on the phase resistances and an estimated average resistance between the phases of the synchronous motor, one or more phases of the synchronous motor that correspond to one or more phase resistances representing a resistance imbalance.

Another aspect of the disclosed embodiments includes an electronic power steering (EPS) system. The EPS system includes a processor and a memory. The memory includes instructions that, when executed by the processor, cause the processor to: receive a command voltage signal, identify, in the synchronous motor drive, a resistance imbalance signature from the command voltage signal, determine, based on the resistance imbalance signature, respective phase resistances that correspond to phases of a synchronous motor of the synchronous motor drive, where each respective phase resistance includes a phase transistor resistance and a phase winding resistance, and identify, based on the phase resistances and an estimated average resistance between the phases of the synchronous motor, one or more phases of the synchronous motor that correspond to one or more phase resistances representing a resistance imbalance.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Synchronous machines may include synchronous motor drives that are susceptible to parameter imbalance. Parameter imbalance in a synchronous motor drive may cause undesirable current and torque pulsations that leads to sub-optimal current and torque control. While the undesirable current and torque pulsations are magnified in synchronous motor drives utilizing feedforward current control, synchronous motor drives utilizing feedback current control may still be impacted due to voltage limitations (e.g., a maximum voltage bus limitation, etc.) and regulation bandwidth.

Furthermore, certain non-linear effects, such as temperatures or failure modes may result in a significant change in the behavior of a synchronous machine. For example, motor winding involves placing wires of a synchronous motor of the synchronous machine within coils that are closed around a coated flexible magnetic core. During a process to wind the wires (e.g., a phase winding process), an attempt is made to wind the wires such that wires corresponding to each respective phase (e.g., phase a, phase b, and phase c) are wound such that resistance is equal. However, temperature changes driven by heat created during the phase winding process may cause a resistance imbalance in one or more of the phases. Consequently, detection, identification, and/or correction of such non-linear effects may be beneficial for improving performance of synchronous machines utilizing synchronous motor drives.

Additionally, some requirements and/or regulations specify that certain synchronous machines satisfy minimal part-to-part variation. For example, high performance motion control applications that are sensitive to noise, vibration, and harshness (e.g., applications involving mass manufacturing, such as EPS) are subject to requirements or regulations. The requirements or regulations may, for example, specify that the synchronous machines satisfy a minimal part-to-part variation. The parameter imbalances in synchronous motor drives of synchronous machines that are subject to such requirements may make compliance with such requirements difficult. If left undetected and/or uncorrected, the parameter imbalances may result in overall system performance degradation and/or faults. The overall system performance degradation and/or faults may reduce the longevity of one or more components of the synchronous machines, may increase costs at various stages of a product life cycle of one or more components of the synchronous machines, may reduce the likelihood that a customer may purchase a particular synchronous machine, and/or the like. As a result, detection and identification the parameter imbalances may be desirable.

Accordingly, systems and methods, such as those described herein, may be configured to detect and identify resistance imbalances at a phase-specific level of granularity and/or to perform preventive actions based on the resistance imbalances. In some embodiments, the systems and methods described herein may identify a sinusoidal part of a command voltage signal (e.g., to differentiate the sinusoidal part of the command voltage signal from a direct current (DC) part of the command voltage signal).

In some embodiments, the systems and methods described herein may be configured to determine phase winding resistances (e.g., based on estimates of phase transistor resistances, such as field-effect transistor (FET) resistances) and to estimate phase winding temperatures. In some embodiments, the systems and methods described herein may be configured to determine phase transistor resistances (e.g., based on estimates of phase winding resistances) and to estimate phase transistor temperatures.

In some embodiments, the systems and methods described herein may be configured to cause a preventative action to be performed based on the identified resistance imbalance (e.g., an imbalance corresponding to a phase winding resistance and/or to a phase transistor resistance), based on the phase determined to have the resistance imbalance, based on an estimated temperature (e.g., a phase winding temperature, a phase transistor temperature) corresponding to the resistance imbalance, or a combination thereof. The preventative action may include an action to slow down the motor, an action to stop the motor, an action causing imbalanced resistance at a particular phase to be rebalanced, an action performed in response to an identified or predicted defect (e.g., identified or predicted based on the imbalanced resistance), an action performed in response to an identified or predicted overheating of a winding of the synchronous motor, any other suitable preventative action, or a combination thereof.

The systems and methods described herein may be configured to provide at least the benefits of identifying a resistance imbalance at a phase-specific level of granularity in a synchronous motor, estimating temperatures of a winding of the motor (or temperatures of a transistor), performing preventative actions based on identification of the resistance imbalance and/or the estimated temperature, and/or the like. The systems and methods described herein may be applicable for various machine configurations (e.g., permanent magnet or wound, non-salient or salient, multiple phases, etc.). Further, the systems and methods described herein may be implemented by a processor in real-time while the synchronous motor is being operated. The systems and methods described herein may also be implemented by a processor at the end of line (EOL) at manufacturing plants.

Figure 1:
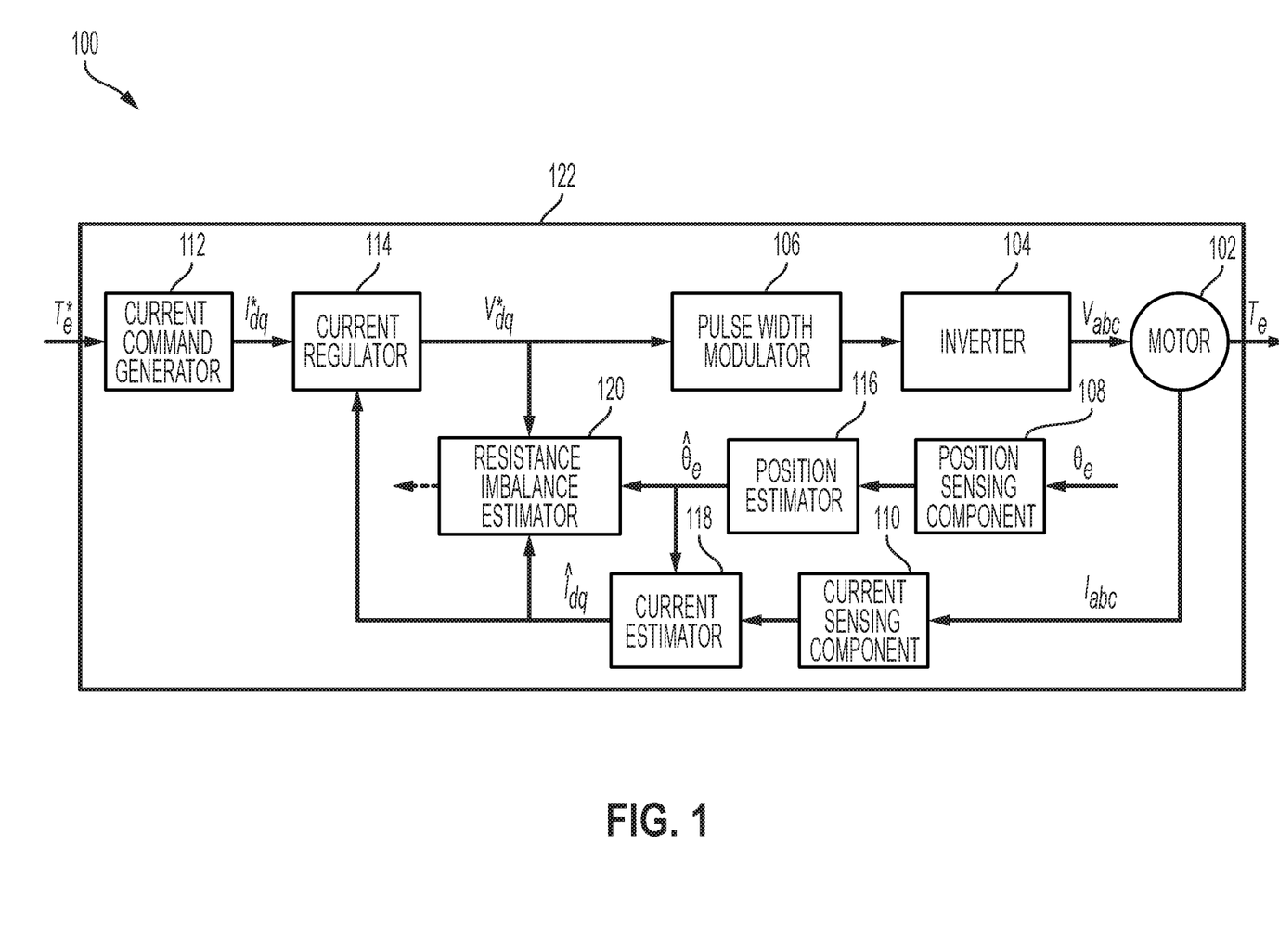
FIG. 1 generally illustrates a phase resistance imbalance detection and identification system according to the principles of the present disclosure.

FIG. 1 generally illustrates a phase resistance imbalance detection and identification system 100 (referred to hereafter as system 100) according to the principles of the present disclosure. The system 100 may include a motor, such as a synchronous motor 102, an inverter 104, a pulse width modulator 106, a position estimator 108, a current sensing component 110, a current command generator 112, a current regulator 114, a position estimator 116, a current estimator 118, and a resistance imbalance estimator 120. In some embodiments, as depicted, the system 100 may utilize closed loop current control. It should be understood that the system 100 may include additional or fewer components than those described herein. The synchronous motor 102 may generate rotational or linear force used to power a machine, such as those described herein. While one or more embodiments may refer to synchronous motor 102, it is to be understood that this is provided by way of example, and that in practice, another type of suitable motor may be used. Various components of the system 100 may be used as part of a synchronous motor drive 122 (e.g., current regulator 114, pulse width modulator 106, inverter 104, and/or the like). The synchronous motor drive 122 may be an electronic device that controls the electrical energy sent to the synchronous motor 102. The synchronous motor drive 122 may provide voltage to the synchronous motor 102 in varying amounts and at varying frequencies, thereby indirectly controlling the speed and torque of the synchronous motor 102.

In some embodiments, the current command generator 112 may receive a commanded electromagnet torque $T^*_e$ as an input. The commanded electromagnetic torque may be input by a user using a computing device, may be preprogrammed for the synchronous motor 102, and/or may be received via another suitable method. The current command generator 112 may generate a commanded current I*$_{dq}$ based on the commanded electromagnetic torque. In some embodiments, the current regulator 114 may receive the commanded current I*$_{dq}$ from the current command generator 112. In some embodiments, the current regulator 114 may receive the commanded current I*$_{dq}$ that is input by a user using a computing device. In some embodiments, the current regulator 114 is used in a feedback controlled synchronous motor drive 122 to track the commanded currents with minimal error.

In some embodiments, the current regulator 114 transmits a command voltage signal to the pulse width modulator 106. Additionally, or alternatively, the current regulator 114 transmits the command voltage signal to the resistance imbalance estimator 120. The command voltage signal, as used herein, may refer to a voltage signal that system 100 assumes to be equal or nearly equal to a measured voltage. In some embodiments, the command voltage signal may include a constant part, and in some embodiments, the command voltage signal may include a constant part and a sinusoidal part. If the command voltage signal includes only the constant part, then there may be no resistance imbalance because the sinusoidal part of the voltage output signal represents the pulsations that include a resistance imbalance signature. As will be described further herein, when the command voltage signal includes the constant part and the sinusoidal part, the sinusoidal part is identified as the resistance imbalance signature.

The pulse width modulator 106 may, over a given time period, control a duration of time the command voltage signal is high and a duration of time the command voltage signal is low. Such a technique of controlling the duration of time when the command voltage signal is high and low may control the direction of the synchronous motor 102. The inverter 104 may be a voltage source inverter and may vary the frequency of the voltage provided to the synchronous motor 102 to control the torque of the synchronous motor 102. The inverter 104 may provide the command voltage signal as an input voltage V$_{abc}$ to the synchronous motor 102. The synchronous motor 102 may use the voltage V$_{abc}$ to generate an amount of current that may be equal to the commanded current I*$_{dq}$ or that may vary from the commanded current I*dq (e.g., when there is a resistance imbalance).

The synchronous motor 102 may provide current I$_{abc}$ to a current sensing component 110. The current sensing component 110 (e.g., a current sensor) may be configured to detect an electric current in a circuit. The current sensing component 110 may provide signals indicating the current I$_{abc}$ to the current estimator 118. The current estimator 118 may also receive, from the position estimator 116, signals indicative of an electrical (phase) position θ of the synchronous motor 102. For example, the position sensing component 108 may measure or sense the phase of the synchronous motor 102 and may provide a signal indicating the position to the position estimator 116. The position estimator 116 may provide the signal indicating the phase θ to the current estimator 118. The current estimator 118 may estimate the amount of current output by the synchronous motor 102 (e.g., based on the signals indicative of the current I$_{abc}$ and the phase θ of the synchronous motor 102). In some embodiments, the current estimator 118 provides an estimated current Î$_{dq}$ to the current regulator 114. Additionally, or alternatively, the current estimator 118 provides the estimated current Î$_{dq}$ to the resistance imbalance estimator 120.

The current regulator 114 may receive the estimated current Î$_{dq}$ and compare it to the commanded current I*$_{dq}$. If the current regulator determines that there is a difference between the estimated current Î$_{dq}$ and the commanded current I*$_{dq}$, the current regulator 114 may transmit a voltage command signal V*$_{dq}$ that will cause the estimated current Î$_{dq}$ to exactly match the commanded current I*$_{dq}$. As such, since the commanded current I*$_{dq}$ is constant and the estimated current Î$_{dq}$ equals the commanded current I*$_{dq}$, then the estimated current Î$_{dq}$ is also constant. To maintain the constant current, the current regulator 114 may cause pulsations in the command voltage signal V*$_{dq}$.

The resistance imbalance estimator 120 reads the command voltage signal V*$_{dq}$ from the current regulator 114. The resistance imbalance estimator 120 includes a mathematical transform block, a magnitude and phase calculation block, an average resistance estimation block, a phase resistance calculation block, a phase winding and transistor resistance estimation block, and a phase winding and transistor temperature estimation block. As will be described, the resistance imbalance estimator 120 may use mathematical models to identify a resistance imbalance signature (e.g., in the event that a resistance imbalance is present). The resistance imbalance estimator 120 receives the command voltage signal V*$_{dq}$ and receives the signal indicating the phase θ of the synchronous motor 102. The resistance imbalance estimator 120 determines whether a resistance imbalance exists based on the command voltage signal V*$_{dq}$. For example, if the resistance imbalance estimator 120 determines that the command voltage signal V*$_{dq}$ just includes a constant part, without a sinusoidal part, then resistance imbalance estimator 120 determines there is no resistance imbalance represented in the command voltage signal V*$_{dq}$. The sinusoidal part may refer to pulsating portion of the command voltage signal V*dq and may represent at least the resistance imbalance signature. If the resistance imbalance estimator 120 determines the command voltage signal V*dq includes the constant part and the sinusoidal part, then the resistance imbalance estimator 120 determines a resistance imbalance is detected because the sinusoidal part represents the resistance imbalance signature. In some embodiments, the identification of the resistance imbalance signature may be made in real-time (e.g., less than 2 seconds).

Further details about the command voltage signal V*$_{dq}$ may be determined by the resistance imbalance estimator 120, such as a certain phase resistance that has the resistance imbalance. For example, the resistance imbalance estimator 120 may determine, for each respective phase of the synchronous motor 102, a phase resistance based on an operating condition of the synchronous motor 102 being satisfied. A phase resistance represents a circuit resistance and may include a motor stator resistance (referred to herein as a phase winding resistance) and a phase transistor resistance (e.g., of the FETs of the power converter). The operating condition may pertain to a speed of the synchronous motor 102 satisfying a threshold, a current output by the synchronous motor 102 satisfying a particular threshold, a current magnitude satisfying a particular threshold, a resistance of a phase of the synchronous motor 102 satisfying a particular threshold, a resistance magnitude satisfying a particular threshold, a voltage magnitude satisfying a particular threshold, and/or the like.

The following discussion pertains to the mathematical models used to perform the techniques described herein. For example, a mathematical model of a three phase permanent magnet synchronous motor (PMSM) in a stationary reference frame (i.e., an abc reference frame) may be expressed as follows:

$$V_{an}=R_a I_a+\dot{\lambda}_{al}+\omega_e \lambda_m \sin\theta \qquad (1a)$$

$$V_{bn}=R_b I_b+\dot{\lambda}_{bl}+\omega_e \lambda_m \sin(\theta-\beta) \qquad (1b)$$

$$V_{cn}=R_c I_c+\dot{\lambda}_{cl}+\omega_e \lambda_m \sin(\theta-2\beta) \qquad (1c)$$

In equations (1a)-(1c), $V_x$ ($V_{an}$, $V_{bn}$, or $V_{cn}$) represents a terminal voltage, $I_x$ ($I_a$, $I_b$, or $I_c$) represents a phase current, $R_x$ ($R_a$, $R_b$, or $R_c$) represents a phase resistance, $\lambda_{xl}$ ($\lambda_{al}$, $\lambda_{bl}$, or $\lambda_{cl}$) represents an inductance dependent flux linkage for phase x (phase a, b, or c), $\lambda_m$ represents a permanent magnet flux linkage, $L_d$ and $L_q$ represent the d axis and q axis inductances, respectively, $T_e$ represents the electromagnetic torque, θ represents the electrical (phase) position of the synchronous motor 102, and β represents a constant equal to 2π/3 radians. It is desirable for the phase resistances at each phase to be equal to one another. That is, phase resistances $R_a$, $R_b$, and $R_c$ should all be equal. When the phase resistances are unequal, the phase resistances may be written as follows:

$$R_a=R+\Delta R_a$$

$$R_b=R+\Delta R_b$$

$$R_c=R+\Delta R_c \qquad (2)$$

Where the $\Delta R_x$ term represents the deviation of the value for phase x from the nominal value R. In many applications, the phase imbalance is ignored. For example, the commonly known synchronous reference frame (i.e., the dq model), which consists of average or DC equations, does not consider position-dependent pulsations. Furthermore, when the resistances are imbalanced between the phases, the analytical machine model is no longer position-independent. To address this, a true dq reference model can be obtained by using the correct stationary frame equations and applying the appropriate mathematical transformation. The resultant voltage equations are obtained as follows:

$$V_d = V_{di} + V_{dR} \qquad (3)$$

$$V_{di} = R_i I_d + L_s \dot{i}_d + \omega_e L_s I_q$$

$$V_{dR} = K_R \cos(2\theta + \phi_R) I_d + K_R \sin(2\theta + \phi_R) I_q$$

$$V_q = V_{qi} + V_{qR}$$

$$V_{qi} = R_i I_q + L_q \dot{i}_q - \omega_e L_d I_d + \omega_e \lambda_m \qquad (4)$$

$$V_{qR} = K_R \sin(2\theta + \phi_R) I_d - K_R \cos(2\theta + \phi_R) I_q$$

$$R_i = R + \frac{\Delta R_a + \Delta R_b + \Delta R_c}{3} \qquad (5)$$

$$K_R = \frac{1}{3}\sqrt{\Delta R_a^2 + \Delta R_b^2 + \Delta R_c^2 - \Delta R_a \Delta R_b - \Delta R_b \Delta R_c - \Delta R_c \Delta R_a}$$

$$\phi_R = \tan^{-1}\left(\frac{\sqrt{3}(-\Delta R_b + \Delta R_c)}{2\Delta R_a - \Delta R_b - \Delta R_c}\right)$$

In equations (3)-(5), i represents ideal terms (e.g., the terms involved in the average machine model that does not include imbalance effects), while the remaining terms are generated based on the imbalances in the machine resistances as indicated by the subscript R. These equations represent the true or real machine behavior and do not involve a control strategy.

Feedback current control employs high bandwidth current regulators which cause the measured currents (which are phase currents transformed to the synchronous reference frame (i.e., the dq model) using position measurement) to follow the commanded currents. Assuming an ideal first order closed loop current control response for both the d and q axes, the reference and actual currents are related in the synchronous reference frame as follows:

$$I_d = \frac{\omega_d}{s+\omega_d}I_d^* \qquad (6)$$

$$I_q = \frac{\omega_q}{s+\omega_q}I_q^*$$

If the bandwidth of the current control regulator 114 is assumed to be sufficiently high, the actual currents can be assumed to be equal to the commands. With this assumption, the voltages output at a steady-state from the current control regulator 114 that arise due to resistance imbalance can be expressed as follows:

$$V_{df}=R_i I^*_d+\omega_e L_s 1^*_q-K_R \sin(2\theta-\phi_R)I^*_d+K_R \cos(2\theta-\phi_R)I^*_q \qquad (7)$$

$$V_{qf}=R_i I^*_q-\omega_e L_d I^*_d+\omega_e \lambda_m+K_R \cos(2\theta-\phi_R)I^*_d+K_R \sin(2\theta-\phi_R)I^*_q$$

The voltage pulsations due to resistance imbalance will vary with the motor currents. Notice that in this case, there is no current pulsations in the feedback control operation, rather, there are voltage pulsations at twice the synchronous frequency. This may be understood intuitively considering that the current regulators have to apply non-constant voltages to balance the machine-induced voltage ripples, such that the measured or actual currents are tracked without error. In reality, the bandwidth of the current control regular 114 is not infinite, and thus the tracking cannot be ideal throughout the operating frequency range.

Figure 2:
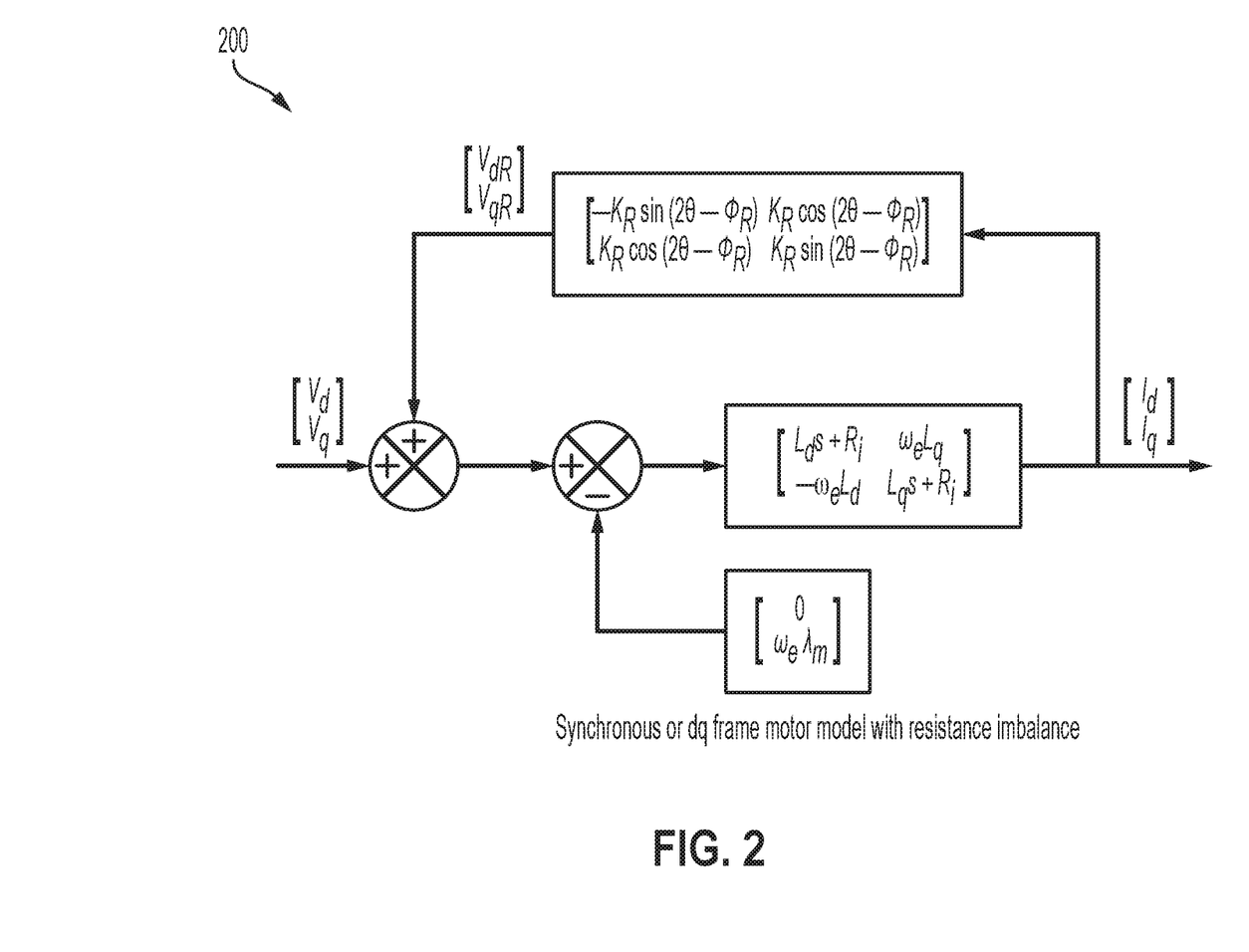
FIG. 2 generally illustrates block diagrams for mathematical models, according to the principles of the present disclosure.

FIG. 2 generally illustrate block diagrams for mathematical models incorporating resistance imbalance according to the principles of the present disclosure.

Figure 3:
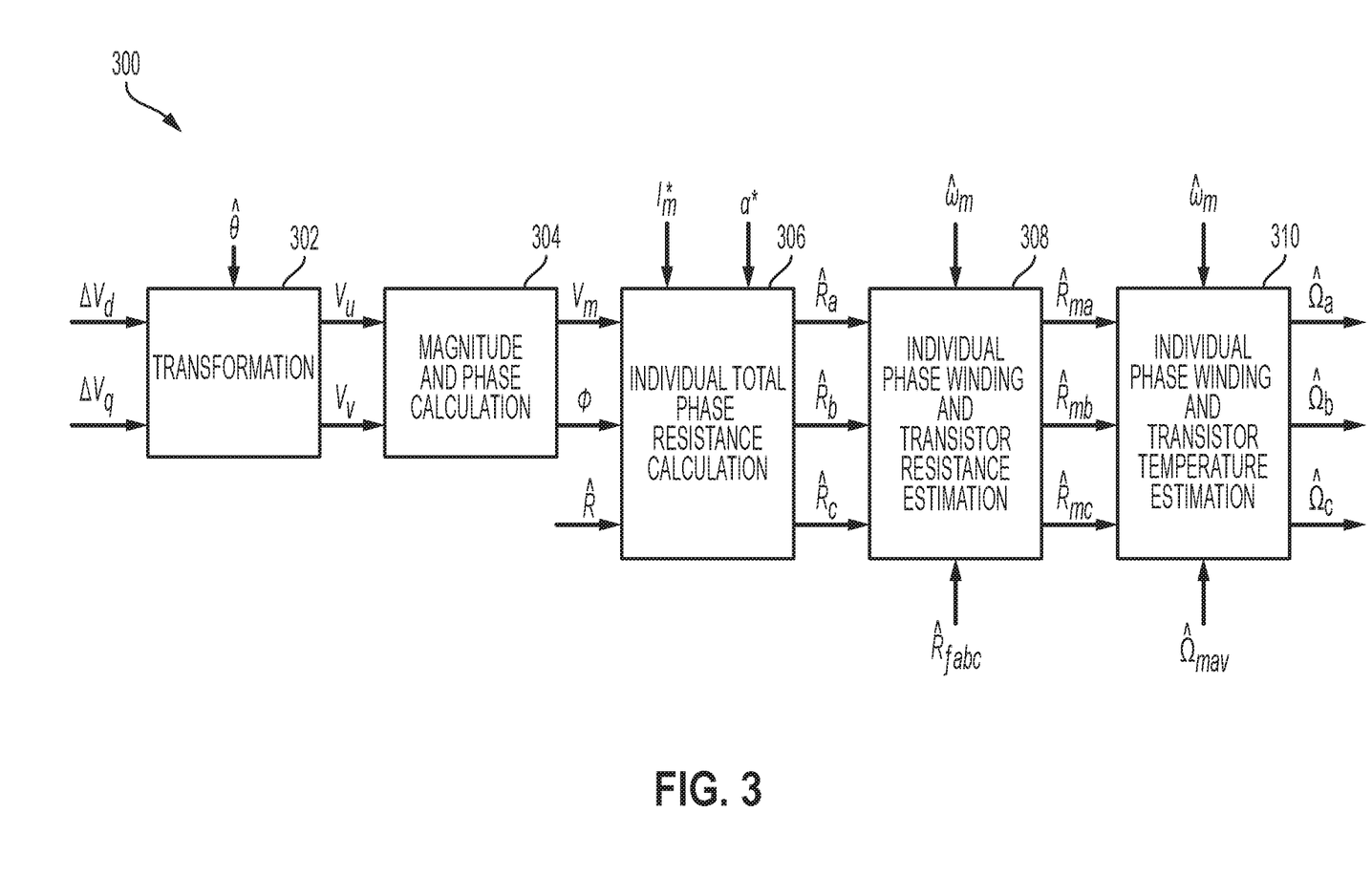
FIG. 3 generally illustrates a resistance imbalance estimator, according to some embodiments.

FIG. 3 generally illustrates the resistance imbalance estimator 120 in more detail according to some embodiments. In some embodiments, the resistance imbalance estimator 120 (e.g., using transformation block 302) may receive the command voltage signals ($V^*_{dq}$) from current regulator 114. Closed-loop current control includes suppressing the pulsations resulting from resistance imbalance in the currents by applying pulsating voltage commands. Thus, the command voltage signals in the synchronous reference frame (dq model) include DC signals ($V^*_{dq0}$) as well as pulsations ($\Delta V^*_{dq}$), such as second electrical order pulsations.

In some embodiments, the resistance imbalance estimator 120 (e.g., using transformation block 302) may apply a transformation technique to identify and convert (demodulate) the pulsating portion of command voltage signals $\Delta V^*_d$ and $\Delta V^*_q$ into diagnostic voltages $V_u$ and $V_v$. For example, the resistance imbalance estimator 120 may identify and convert the pulsating portion of command voltage signals $\Delta V^*_d$ and $\Delta V^*_q$ into diagnostic voltages $V_u$ and $V_v$ using an Inverse Park Transform or similar type of demodulator. The resulting diagnostic (i.e., uv) voltages are provided below:

$$\begin{bmatrix} V_u \\ V_v \end{bmatrix} = \begin{bmatrix} \cos 2\theta & \sin 2\theta \\ \sin 2\theta & -\cos 2\theta \end{bmatrix} \begin{bmatrix} \Delta V_d^* \\ \Delta V_q^* \end{bmatrix} \qquad (8)$$

-continued $$V_u = V_d\cos 2\theta + V_q\sin 2\theta \quad (9)$$
$$= (V_{di} + V_{dR})\cos 2\theta + (V_{qi} + V_{qR})\sin 2\theta$$
$$= V_{ur} + V_{uR}$$
$$V_v = V_d\sin 2\theta - V_q\cos 2\theta \quad (10)$$
$$= (V_{di} + V_{dR})\sin 2\theta - (V_{qi} + V_{qR})\cos 2\theta$$
$$= V_{vr} + V_{vR}$$

In equations (8)-(10), $V_u$ and $V_v$ represent the demodulated diagnostic voltages, $\theta$ represents an estimated phase of the synchronous motor 102 (and is scaled by a factor of two), $\Delta V^*_d$ and $\Delta V^*_q$ represent the pulsating portion of the command voltage signals, i represents ideal terms, while the remaining terms are generated based on the resistance imbalances as indicated by the subscript R. These equations represent the true or real machine behavior and do not involve a control strategy. Thus, the final voltage terms ($V_{uR}$ and $V_{vR}$) may be obtained by based on the contributions of the voltage pulsations resulting from respective resistances. The final expressions are obtained as:

$$V_{uR} = K_R \sin \phi_R I^*_d + K_R \cos \phi_R I^*_q \quad (11)$$

$$V_{vR} = -K_R \cos \phi_R I^*_d - K_R \sin \phi_R I^*_q \quad (12)$$

In some embodiments, the resistance imbalance estimator 120 may use adaptive low-pass filters to identify and convert the pulsating portion of the command voltage signals. For example, adaptive low-pass filters may be implemented in the synchronous reference frame (dq model) by applying a mathematical transform that utilizes the estimated phase followed by low-pass filtering as follows:

$$\begin{bmatrix} V_u \\ V_v \end{bmatrix} = \begin{bmatrix} \frac{1}{\tau_d \hat{s} + 1} & 0 \\ 0 & \frac{1}{\tau_q \hat{s} + 1} \end{bmatrix} \begin{bmatrix} \cos 2\hat{\theta} & \sin 2\hat{\theta} \\ \sin 2\hat{\theta} & -\cos 2\hat{\theta} \end{bmatrix} \begin{bmatrix} \Delta V_d \\ \Delta V_q \end{bmatrix} \quad (13)$$

In equation (13), $\tau_d$ and $\tau_q$ represent the low pass filter time constants and $\hat{s}$ represents an estimate of the derivative operator which may be implemented in discrete time using any of the commonly known continuous to discrete time domain transformation techniques. In some embodiments, bandpass filters may be configured to perform pre-filtering in the synchronous reference frame (dq model) before transformation.

In some embodiments, the resistance imbalance estimator 120 (e.g., using magnitude and phase calculation block 304) may determine a magnitude and a phase of the diagnostic voltages $V_u$ and $V_v$. As an example, using the output of equation (8) or equation (13), the average magnitude and phase of the diagnostic voltages $V_u$ and $V_v$ may be obtained as follows:

$$\hat{V}_m = \sqrt{V_u^2 + V_v^2} \quad (14)$$

$$\tan \hat{\phi}_m = \frac{\Delta V_u}{\Delta V_v} \quad (15)$$

In equations (14) and (15), $\hat{V}_m$ and $\tan \hat{\phi}_m$ represent the average magnitude and phase of the diagnostic voltages. As will be shown further herein, the average magnitude of the voltage commands may be used to detect the presence of a resistance imbalance and the phase may be used to identify the relative mismatch between respective phase resistances.

In some embodiments, the resistance imbalance estimator 120 may identify one or more phase resistances that represent the parameter imbalance based on an operating condition of the synchronous motor being satisfied. Further, an identification of the phase resistance representing the resistance imbalance based on the operating condition being satisfied is made in response to the magnitude of the command voltage signal being non-zero (e.g., significant) during the operating condition. For example, if the operating condition includes the speed of the motor below the first threshold (e.g., low) and the amount of current output above the second threshold (e.g., high), and a magnitude of the diagnostic voltage (e.g., command voltage signal) is non-zero, then a resistance imbalance is identified.

In some embodiments, the synchronous motor drive 122 includes an average resistance estimator (not shown) to estimate the mean resistance of the phases based on an average transistor temperature estimate $\hat{\Omega}_{fav}$ and an average phase winding temperature estimate $\hat{\Omega}_{mav}$ along with pre-determined nominal average transistor $R_{f0}$ and phase winding resistances $R_{m0}$, respectively. The temperature estimates are, for example, determined based on thermistors located in close proximity to either the inverter section or the motor phase windings, along with an averaged thermal model of the motor drive system. The average resistance estimate $\hat{R}_{av}$ is determined as follows:

$$\hat{R}_{av} = R_{f0}(1 + \alpha_f(\hat{\Omega}_{fav} - \Omega_0)) + R_{m0}(1 + \alpha_w(\hat{\Omega}_{mav} - \Omega_0)) \quad (16)$$

In equation 16, $\Omega_0$ is a nominal temperature value at which the nominal transistor and phase winding resistances are determined. In addition to this type of open-loop or feedforward average resistance estimation, a feedback type learn algorithm to further correct any temperature estimation errors or nominal value errors may also be implemented. This provides an accurate estimate of the average total resistance value.

In some embodiments, the resistance imbalance estimator 120 may utilize an average phase resistance estimate $\hat{R}$ which indicates an average of the three (total) phase resistances as follows:

$$\frac{\hat{R}_a + \hat{R}_b + \hat{R}_c}{3} = \hat{R} \quad (17)$$

In equation (17), the term $\Delta \hat{R}$ represents an estimated average phase resistance between phases a, b, and c, the term $\Delta \hat{R}_a$ represents an estimated phase resistance at phase a, the term $\Delta \hat{R}_b$ represents an estimated phase resistance at phase b, and the term $\Delta \hat{R}_c$ represents an estimated phase resistance at phase c. As will be described herein, the outputs from equations (14) and (15), and/or (16) may be used to determine each respective phase resistance.

In some embodiments, the average magnitude and phase of the diagnostic voltages may be used to estimate the terms $\hat{K}_r$ and $\hat{\phi}_r$ by using the commanded current magnitude $I^*_m$ and angle $\alpha^*$ as follows:

$$\hat{K}_r = \frac{\hat{V}_m}{I^*_m} \quad (18)$$

-continued $$\tan \hat{\phi}_r = \frac{\tan \hat{\phi}_m - \tan \alpha^*}{1 + \tan \alpha^*} \quad (19)$$

In equation (18), $\hat{K}_r$ represents a quotient of the average voltage magnitude and a magnitude of the commanded currents. In equation (19), $\tan \hat{\phi}_r$ represents a quotient of $\tan \hat{\phi}_m - \tan \alpha^*$ and $1 + \tan \alpha^*$.

In some embodiments, the resistance imbalance estimator 120 (e.g., using phase resistance calculation block 306) may determine, for each phase, a phase resistance. For example, the resistance imbalance estimator 120 may determine a phase resistance based on one or more operating conditions of the synchronous motor 102 being satisfied. The one or more operating conditions pertain to a speed of the synchronous motor 102 satisfying a threshold, a current output by the synchronous motor 102 satisfying a particular threshold, a current magnitude satisfying a particular threshold, a resistance of a phase of the synchronous motor 102 satisfying a particular threshold, a resistance magnitude satisfying a particular threshold, a voltage magnitude satisfying a particular threshold, and/or the like.

The analytical model of the PMSM machine involves a total circuit resistance (referred to herein as a phase resistance), which includes a motor stator resistance (referred to herein as a phase winding resistance) and a phase transistor resistance (e.g., of the FETs of the power converter), as shown below:

$$\hat{R}_x = \hat{R}_{mx} + \hat{R}_{fx} = \hat{R}_{mx0}(1 + \alpha_w(\Omega_w - \Omega_0)) + \hat{R}_{fx0}(1 + \alpha_f(\Omega_f - \Omega_0)) \quad (2)$$

In equation (19), $\hat{R}_x$ represents the total circuit resistance for a phase x, $\hat{R}_{mx}$ represents the motor stator resistance (i.e., the phase winding resistance) for phase x, and $\hat{R}_{fx}$ represents the transistor (FET) resistance for phase x. Additionally, the subscript 0 indicates a nominal value, the subscript m indicates the motor stator resistance, and the nominal value f indicates a FET resistance.

In some embodiments, the resistance imbalance estimator 120 may determine a phase resistance that is associated with the resistance imbalance based on one or more operating conditions of the synchronous motor 102 being satisfied. For example, the resistance imbalance estimator 120 may receive a signal indicating an average magnitude $\hat{V}_m$ of the diagnostic voltages $V_{uv}$, a signal indicating an average phase magnitude $\tan \hat{\phi}_m$, a signal indicating an average phase resistance estimate $\hat{R}$, a signal indicating the commanded current magnitude $I^*_m$, and/or a signal indicating the angle $\alpha^*$. In this case, the resistance imbalance estimator 120 may compare received values with threshold values associated with the one or more operating conditions and may determine the phase resistance based on the comparison. The resistance imbalance estimator 120 may perform the comparison for values associated with each phase. If a received value satisfies a threshold value corresponding to an operating condition, the resistance imbalance estimator 120 may determine that the phase resistance is manifesting the resistance imbalance.

In some embodiments, the resistance imbalance estimator 120 may determine phase resistance error terms. For example, the resistance imbalance estimator 120 may determine phase resistance error terms using equation (17) and the following:

$$\Delta \hat{R}_a^2 + \Delta \hat{R}_b^2 + \Delta \hat{R}_c^2 - \Delta \hat{R}_a \Delta \hat{R}_b - \Delta \hat{R}_b \Delta \hat{R}_c - \Delta \hat{R}_c \Delta \hat{R}_a = 9 \hat{K}_r^2 \quad (21)$$

$$\frac{-\Delta \hat{R}_b + \Delta \hat{R}_c}{2\Delta \hat{R}_a - \Delta \hat{R}_b - \Delta \hat{R}_c} = \frac{\tan \hat{\phi}_r}{\sqrt{3}} \quad (22)$$

The phase resistance error terms may be utilized when performing temperature estimation, as will be described further herein.

Thus, in some embodiments, the resistance imbalance estimator 120 (e.g., using phase resistance calculation block 306) may execute equations (16), (21), and (22) in real-time to determine individual phase resistances. For example, the resistance imbalance estimator 120 may execute equation (16) to determine $\hat{R}$, execute equation (21) to compute $\hat{K}_r$, and my execute equation (22) to compute $\tan \hat{\phi}_r$. This allows the resistance imbalance estimator 120 to use $\hat{R}$, $\hat{K}_r$, and $\tan \hat{\phi}_r$ to determine $R_a$, $R_b$, and $R_c$, respectively.

In some embodiments, as will be described further herein, the resistance imbalance estimator 120 (e.g., using phase winding and transistor resistance estimation block 308) may estimate phase transistor (FET) resistances for each respective phase (abc) of the synchronous motors 102 and may use the estimated phase transistor resistances to determine phase winding resistances. The determined phase winding resistances may be used to estimate corresponding phase winding temperatures. In some embodiments, as will be described further herein, the resistance imbalance estimator 120 may, for each respective phase, estimate phase winding resistances which may be used to determine phase transistor resistances. The determined phase transistor resistances may be used to estimate corresponding phase transistor temperatures.

In some embodiments, the resistance imbalance estimator 120 may estimate phase transistor (FET) resistances based on temperature readings. For example, a thermal sensor may be part of a temperature estimation subsystem of 100 and may be located in a vicinity of the inverter 104. The thermal sensor may include a negative temperature coefficient thermistor, a resistance temperature detector, a thermocouple, a semiconductor-based sensor, and/or the like. The thermal sensor may measure or sense temperature readings corresponding to the transistor resistances and may provide a signal indicating the temperature readings to the resistance imbalance estimator 120. The resistance imbalance estimator 120 may estimate phase transistor resistances for respective phases based on the signal indicating the temperature readings. This allows the resistance imbalance estimator 120 to determine phase winding resistances based on the estimated phase transistor resistances (e.g., by subtracting the estimated phase transistor resistances from the previously determined phase resistances).

In some embodiments, the imbalance estimator 120 may estimate a phase transistor resistance using the following equation:

$$\Delta \hat{R}_a = \Delta \hat{R}_{ma} + \Delta \hat{R}_{fa}. \quad (23)$$

In equation (23), $\Delta \hat{R}_a$ represents a total resistance error for a phase resistance of phase a, $\Delta \hat{R}_{ma}$ represents a resistance error of a phase winding resistance that is part of the phase resistance for phase a, and $\hat{R}_{fa}$ represents a resistance error of a transistor (FET) resistance that is also part of the phase resistance for phase a. If the transistor resistance estimate is assumed to be accurate, the value of $\Delta \hat{R}_{fa}$ is zero implying zero error in the estimation of transistor resistance and that the overall resistance imbalance is caused by winding temperature mismatch. In such a case, since the resistance imbalance of the phase is related to the corresponding temperature of the winding, the transistor resistance estimate may be further utilized to estimate the temperature of windings that correspond to phase a, as will be shown further herein.

In some embodiments, the resistance imbalance estimator 120 (e.g., using phase winding and transistor resistance estimation block 308) may estimate phase winding resistances based on temperature readings. For example, a thermal sensor may be part of a temperature estimation subsystem of 100 and may be located in a vicinity of the windings of motor 102. The thermal sensor may measure or sense temperature readings corresponding to the phase winding resistances and may provide a signal indicating the temperature readings to the resistance imbalance estimator 120. The resistance imbalance estimator 120 may estimate phase winding resistances for respective phases based on the signal indicating the temperature readings. This allows the resistance imbalance estimator 120 to determine phase transistor resistances based on the estimated phase winding resistances (e.g., by subtracting the estimated phase winding resistances from the previously determined phase resistances).

In some embodiments, the imbalance estimator 120 may estimate a phase winding resistance using equation (23). For example, if the phase winding resistance estimate is assumed to be accurate, the value of $\Delta \hat{R}_{ma}$ is zero implying zero error in the estimation of phase winding resistance and that the overall resistance imbalance is caused by transistor (FET) temperature mismatch. In such a case, since the resistance imbalance of the phase is related to the corresponding temperature of the transistor, the phase winding resistance estimate may be further utilized to estimate the temperature of the transistor, as will be shown further herein.

In some embodiments, the resistance imbalance estimator 120 (e.g., using phase winding and transistor temperature estimation block 310) may estimate phase winding temperatures. For example, the resistance imbalance estimator 120 may estimate the phase winding temperatures for respective phases of the synchronous motor 102 using the following:

$$\hat{\Omega}_{ma} = \hat{\Omega}_{mav} + \Delta\hat{\Omega}_{ma} = \hat{\Omega}_{mav} + \frac{1}{\alpha_w}\left(\frac{\Delta\hat{R}_{ma}}{R_0}\right) \quad (24a)$$

$$\hat{\Omega}_{mb} = \hat{\Omega}_{mav} + \Delta\hat{\Omega}_{mb} = \hat{\Omega}_{mav} + \frac{1}{\alpha_w}\left(\frac{\Delta\hat{R}_{mb}}{R_0}\right) \quad (24b)$$

$$\hat{\Omega}_{mc} = \hat{\Omega}_{mav} + \Delta\hat{\Omega}_{mc} = \hat{\Omega}_{mav} + \frac{1}{\alpha_w}\left(\frac{\Delta\hat{R}_{mc}}{R_0}\right) \quad (24c)$$

In equation (24a), (24b), and (24c), $\hat{\Omega}_{ma}$, $\hat{\Omega}_{mb}$, $\hat{\Omega}_{mc}$ represent phase winding temperature estimates for phases a, b, and c, respectively, $\Omega_0$ represents a nominal phase winding temperature, $\alpha_w$ represents a thermal diffusivity of the windings, $\Delta\hat{R}_a$, $\Delta\hat{R}_b$, and $\Delta\hat{R}_c$, represent the total resistance error for phases a, b, and c, respectively, $R_0$ represents a nominal resistance error, and $\Delta\hat{R}_{ma}$, $\Delta\hat{R}_{mb}$, and $\Delta\hat{R}_{mc}$, represent total phase winding resistance error for phases a, b, and c, respectively.

In some embodiments, the resistance imbalance estimator 120 (e.g., using phase winding and transistor temperature estimation block 310) may estimate phase transistor temperatures. For example, the resistance imbalance estimator 120 may estimate phase transistor temperatures for respective phases of the synchronous motor 102. In some embodiments, the resistance imbalance estimator 120 may estimate phase transistor temperatures using equations similar to those described in equations (24a), (24b), and (24c), where the temperature estimates are transistor temperature estimates, the nominal temperature is a nominal transistor temperature, a thermal diffusivity is a thermal diffusivity of the transistor, and the total phase winding resistance errors are total phase transistor resistance errors.

In some embodiments, there may be only one thermal sensor implemented as part of 100 (e.g., a thermal sensor in a vicinity of a transistor or a thermal sensor in a vicinity of the phase windings). By implementing only one thermal sensor to obtain a first temperature reading (of a transistor or of phase windings), and using embodiments described herein to estimate a second temperature (of the phase windings or of the transistor), costs (e.g., hardware configuration costs, utilization costs, maintenance costs, and/or the like) are reduced relative to a system that needs two or more thermal sensors to carry out one or more of the embodiments described herein.

In some embodiments, the resistance imbalance estimator 120 may cause one or more preventative actions to be performed. For example, the resistance imbalance estimator 120 may provide a signal indicating the resistance imbalance and/or the temperature estimation to a controller or processor to cause the controller or processor to perform one or more preventative actions. Additionally, or alternatively, the signal provided by the resistance imbalance estimator 120 may cause another device or component to perform the preventative action. The preventative action may include an action to slow down the synchronous motor 102, an action to stop the synchronous motor 102, an action causing imbalanced resistance at a particular phase to be rebalanced, an action performed in response to an identified or predicted defect (e.g., identified or predicted based on the imbalanced resistance), an action performed in response to an identified or predicted overheating of a winding of the synchronous motor 102, and/or another suitable preventative action.

As a specific example, assume a vehicle is at a low speed or in a stop position. If the vehicle is in a stopped position, the distribution of temperature of respective windings should be equal. However, if resistance imbalance is present, one of the windings may be significantly hotter than the other windings. The high temperature can cause defects/damage to the windings or related components within the vehicle. By identifying the phase resistance and by estimating the temperature for the windings, damage to the vehicle is prevented or reduced, resources needed to repair the vehicle are conserved, the driver has a safer overall driving experience, and/or the like.

Figure 4:
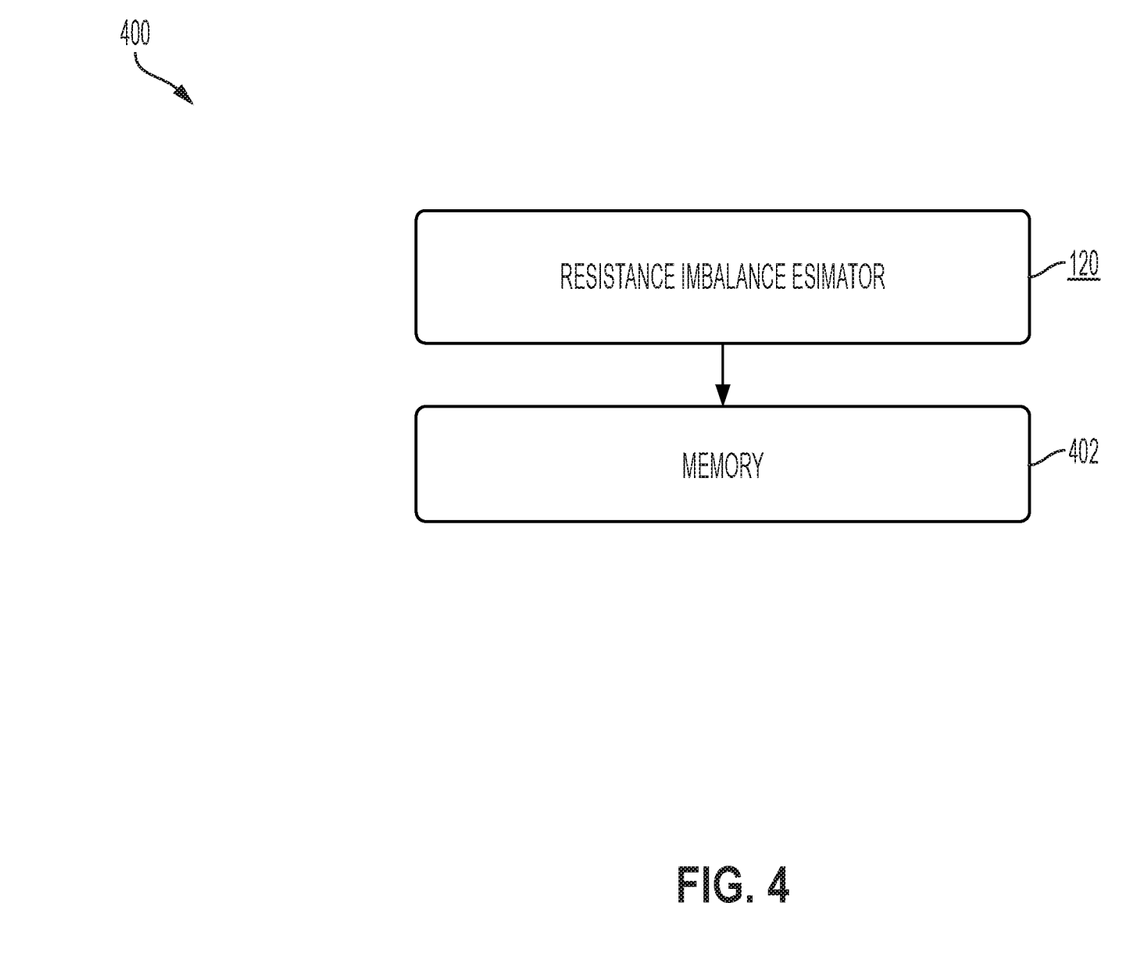
FIG. 4 generally illustrates a phase resistance imbalance detection and identification system, according to the principles of the present disclosure.

FIG. 4 generally illustrates a phase resistance imbalance detection and identification system 400 according to the principles of the present disclosure. The phase resistance imbalance detection and identification system 400 includes the resistance imbalance estimator 120 communicatively coupled to a memory 402. The resistance imbalance estimator 120 may include a processor. The processor may include any suitable processor, such as those described herein. The memory 402 may store instructions that, when executed by the resistance imbalance estimator 120, cause the resistance imbalance estimator 120 to, at least, perform the techniques disclosed herein. In particular, the computer instructions, when executed by the resistance imbalance estimator 120, may cause the resistance imbalance estimator 120 to perform the operations of the method 500 and method 600, as further described below with reference to FIGS. 5 and 6, respectively. In some embodiments, the resistance imbalance estimator 120 may receive one or more input components capable of being used for receiving data and one or more outputs components capable of being used to transmit data.

In some embodiments, a system (e.g., the system 100 or the phase resistance imbalance detection and identification system 400) may perform the methods described herein. However, the methods described herein as performed by the system are not meant to be limiting, and any type of software executed on a controller can perform the methods described herein without departing from the scope of this disclosure. For example, a controller, such as a processor executing software within a computing device, can perform the methods described herein.

Figure 5:
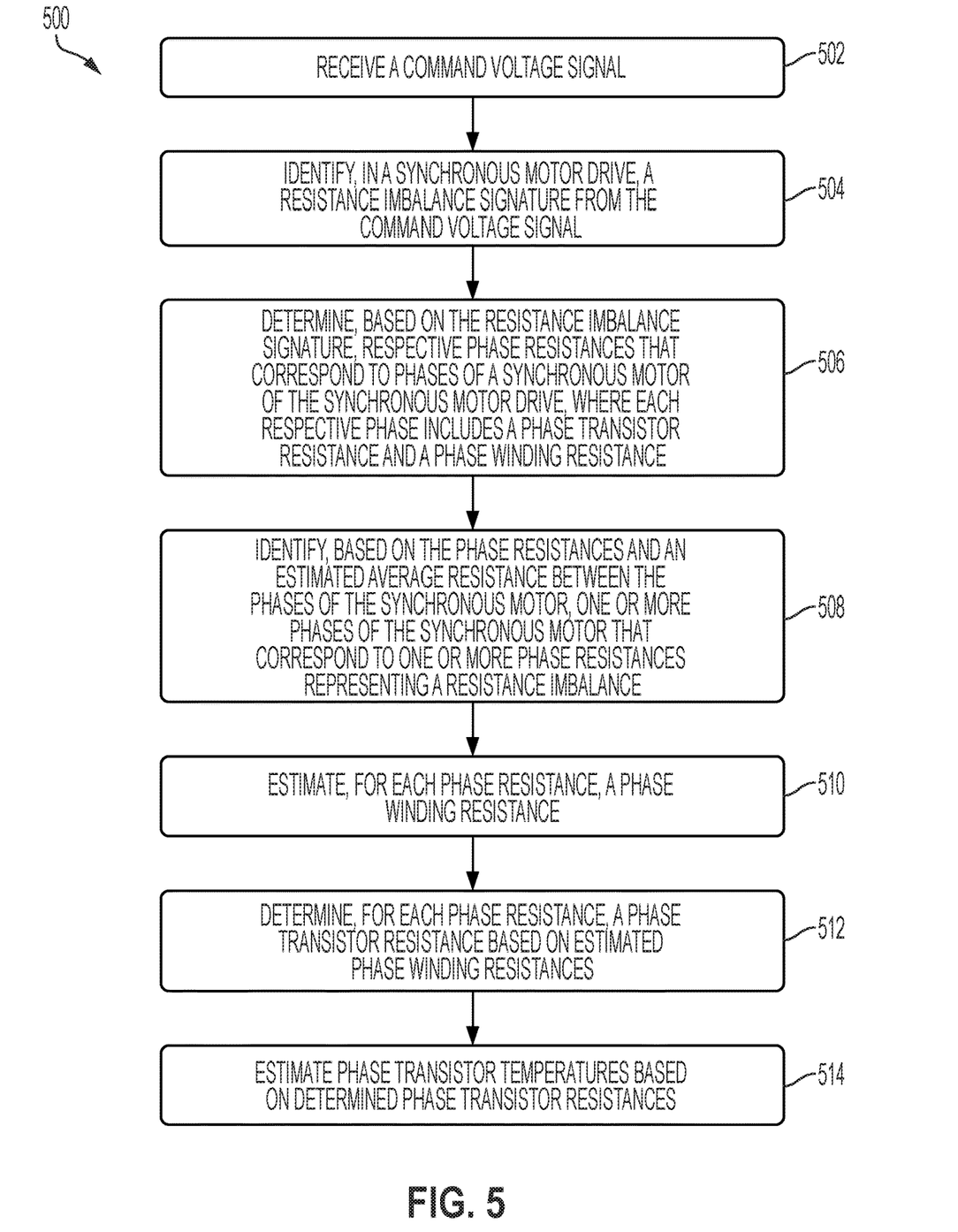
FIG. 5 is a flow diagram generally illustrating a phase resistance imbalance detection and identification method, according to the principles of the present disclosure.

FIG. 5 is a flow diagram generally illustrating a parameter imbalance detection and identification method 500 according to the principles of the present disclosure. At 502, the method 500 receives a command voltage signal. For example, the resistance imbalance estimator 102 (e.g., using an input component, a processor, a memory, and/or the like) may receive the command voltage signal, as described further herein.

At 504, the method 500 identifies, in the synchronous motor drive, a resistance imbalance signature from the command voltage. For example, the resistance imbalance estimator 120 (e.g., using the processor, the memory, and/or the like) may identify, in the synchronous motor drive, a resistance imbalance signature from the command voltage, as described herein.

At 506, the method 500 determines, based on the resistance imbalance signature, respective phase resistances that correspond to phases of a synchronous motor of the synchronous motor drive, where each respective phase resistance includes a phase transistor resistance and a phase winding resistance. For example, the resistance imbalance estimator 120 (e.g., using the processor, the memory, and/or the like) may determine, based on the resistance imbalance signature, respective phase resistances that correspond to phases of a synchronous motor of the synchronous motor drive, as described further herein. Each respective phase resistance may include a phase transistor resistance and a phase winding resistance.

At 508, the method 500 identifies, based on the phase resistances and an estimated average resistance between the phases of the synchronous motor, one or more phases of the synchronous motor that correspond to one or more phase resistances representing a resistance imbalance. For example, the resistance imbalance estimator 120 (e.g., using the processor, the memory, and/or the like) may identify, based on the phase resistances and an estimated average resistance between the phases of the synchronous motor, one or more phases of the synchronous motor that correspond to one or more phase resistances representing a resistance imbalance, as described herein.

At 510, the method 500 estimates, for each phase resistance, a phase winding resistance. For example, the resistance imbalance estimator 120 (e.g., using the processor, the memory, and/or the like) may estimate, for each phase resistance, a phase winding resistance, as described herein. In some embodiments, the method 500 first receives, from a thermal sensor, a signal indicating a phase transistor temperature, and estimates each phase winding resistance based on the signal. For example, the resistance imbalance estimator 120 (e.g., using the input component, the processor, the memory, and/or the like) may receive, from a thermal sensor, a signal indicating a phase transistor temperature, and estimates each phase winding resistance based on the signal.

At 512, the method 500 determines, for each phase resistance, a phase transistor resistance based on estimated phase winding resistances. For example, the resistance imbalance estimator 120 (e.g., using the processor, the memory, and/or the like) may determine, for each phase resistance, a phase transistor resistance based on estimated phase winding resistances, as described herein.

At 514, the method 500 estimates phase transistor temperatures based on determined phase transistor resistances. For example, the resistance imbalance estimator 120 (e.g., using the processor, the memory, and/or the like) may estimate phase transistor temperatures based on determined phase transistor resistances, as described herein. In some embodiments, the method 500 further causes a preventative action to be performed based on at least one of a measured temperature or an estimated temperature, where the measured temperature corresponds to a phase winding temperature and the estimated temperature corresponds to the phase transistor temperature. For example, the resistance imbalance estimator 120 (e.g., using the processor, the memory, an output component, and/or the like) may cause a preventative action to be performed based on at least one of the measured temperature or the estimated temperature.

Figure 6:
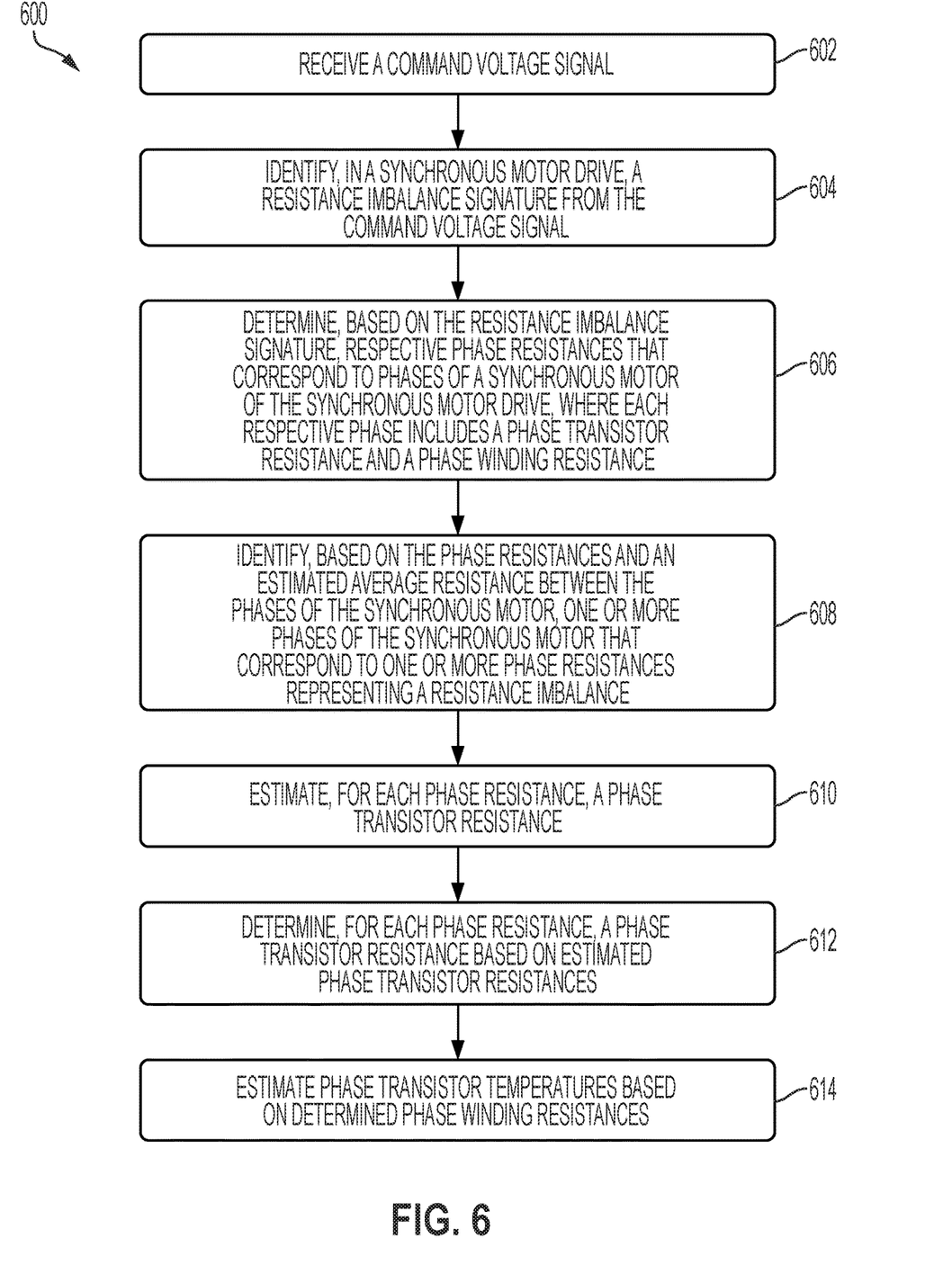
FIG. 6 is a flow diagram generally illustrating a phase resistance imbalance detection and identification method, according to the principles of the present disclosure.

FIG. 6 is a flow diagram generally illustrating a parameter imbalance detection and identification method 600 according to the principles of the present disclosure. At 602, the method 600 receives a command voltage signal. For example, the resistance imbalance estimator 102 (e.g., using an input component, a processor, a memory, and/or the like) may receive the command voltage signal, as described further herein.

At 604, the method 600 identifies, in the synchronous motor drive, a resistance imbalance signature from the command voltage. For example, the resistance imbalance estimator 120 (e.g., using the processor, the memory, and/or the like) may identify, in the synchronous motor drive, a resistance imbalance signature from the command voltage, as described herein.

At 606, the method 600 determines, based on the resistance imbalance signature, respective phase resistances that correspond to phases of a synchronous motor of the synchronous motor drive, where each respective phase resistance includes a phase transistor resistance and a phase winding resistance. For example, the resistance imbalance estimator 120 (e.g., using the processor, the memory, and/or the like) may determine, based on the resistance imbalance signature, respective phase resistances that correspond to phases of a synchronous motor of the synchronous motor drive, as described further herein. Each respective phase resistance may include a phase transistor resistance and a phase winding resistance.

At 608, the method 600 identifies, based on the phase resistances and an estimated average resistance between the phases of the synchronous motor, one or more phases of the synchronous motor that correspond to one or more phase resistances representing a resistance imbalance. For example, the resistance imbalance estimator 120 (e.g., using the processor, the memory, and/or the like) may identify, based on the phase resistances and an estimated average resistance between the phases of the synchronous motor, one or more phases of the synchronous motor that correspond to one or more phase resistances representing a resistance imbalance, as described herein.

At 610, the method 600 estimates, for each phase resistance, a phase transistor resistance. For example, the resistance imbalance estimator 120 (e.g., using the processor, the memory, and/or the like) may estimate, for each phase resistance, a phase transistor resistance, as described herein. In some embodiments, the method 500 first receives, from a thermal sensor, a signal indicating a phase winding temperature, and estimates each phase transistor resistance based on the signal. For example, the resistance imbalance estimator 120 (e.g., using the input component, the processor, the memory, and/or the like) may receive, from a thermal sensor, a signal indicating a phase winding temperature, and estimates each phase transistor resistance based on the signal.

At 612, the method 600 determines, for each phase resistance, a phase winding resistance based on estimated phase transistor resistances. For example, the resistance imbalance estimator 120 (e.g., using the processor, the memory, and/or the like) may determine, for each phase resistance, a phase winding resistance based on estimated phase transistor resistances, as described herein.

At 614, the method 600 estimates phase winding temperatures based on determined phase winding resistances. For example, the resistance imbalance estimator 120 (e.g., using the processor, the memory, and/or the like) may estimate phase winding temperatures based on determined phase winding resistances, as described herein. In some embodiments, the method 500 further causes a preventative action to be performed based on at least one of a measured temperature or an estimated temperature, where the measured temperature corresponds to a phase transistor temperature and the estimated temperature corresponds to the phase winding temperature. For example, the resistance imbalance estimator 120 (e.g., using the processor, the memory, an output component, and/or the like) may cause a preventative action to be performed based on at least one of the measured temperature or the estimated temperature.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such. Some implementations are described herein in connection with thresholds.

Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A system for controlling a synchronous motor drive, the system comprising:

a processor; and
a memory that includes instructions that, when executed by the processor, cause the processor to:
receive a command voltage signal;
identify, in the synchronous motor drive, a resistance imbalance signature from the command voltage signal by demodulating a pulsating portion of the command voltage signal;
estimate one or more phase resistance values for each phase of a synchronous motor drive based on the resistance imbalance signature and a temperature reading from a thermal sensor, wherein the one or more phase resistance values of the synchronous motor drive include a phase transistor resistance value and a phase winding resistance value;
estimate an average resistance between the phases of the synchronous motor drive based on the estimated one or more phase resistance values, an average transistor temperature estimate, and an average phase winding temperature estimate; and
identify, based on the estimated one or more phase resistance values and the estimated average resistance between the phases of the synchronous motor drive, one or more phases of the synchronous motor drive associated with a resistance imbalance.

2. The system of claim 1, wherein the instructions further cause the processor to: receive, from the thermal sensor, a signal indicating a phase transistor temperature; estimate, for each respective phase resistance, the phase transistor resistance value based on the signal; and determine the phase winding resistance value based on the estimated phase transistor resistance value.

3. The system of claim 2, wherein the instructions further cause the processor to estimate a phase winding temperature based on the determined phase winding resistance value.

4. The system of claim 3, wherein the instructions further cause the processor to cause a preventative action to be performed based on at least one of a measured temperature or an estimated temperature, where the measured temperature corresponds to the phase transistor temperature and the estimated temperature corresponds to the phase winding temperature.

5. The system of claim 1, wherein the instructions further cause the processor to receive, from the thermal sensor, a signal indicating a phase winding temperature; estimate, for each respective phase resistance, the phase winding resistance value based on the signal; and determine the phase transistor resistance value based on the estimated phase winding resistance value.

6. The system of claim 5, wherein the instructions further cause the processor to estimate a phase transistor temperature based on the determined phase transistor resistance value.

7. The system of claim 6, wherein the instructions further cause the processor to cause a preventative action to be performed based on at least one of a measured temperature or an estimated temperature, where the measured temperature is the phase winding temperature and the estimated temperature is the phase transistor temperature.

8. A method for detecting an imbalance in a synchronous motor drive, the method comprising:
receiving a command voltage signal;
identifying, in the synchronous motor drive, a resistance imbalance signature from the command voltage signal by demodulating a pulsating portion of the command voltage signal;
estimating one or more phase resistance values for each phase of a synchronous motor drive based on the resistance imbalance signature and a temperature reading from a thermal sensor, wherein the one or more phase resistance values of the synchronous motor drive include a phase transistor resistance value and a phase winding resistance value;
estimating an average resistance between the phases of the synchronous motor drive based on the estimated one or more phase resistance values, an average transistor temperature estimate, and an average phase winding temperature estimate; and
identifying, based on the estimated one or more phase resistance values and the estimated average resistance between the phases of the synchronous motor drive, one or more phases of the synchronous motor drive associated with a resistance imbalance.

9. The method of claim 8, further comprising receiving, from the thermal sensor, a signal indicating a phase transistor temperature; estimating, for each respective phase resistance, the phase transistor resistance value based on the signal; and determining the phase winding resistance value based on the estimated phase transistor resistance value.

10. The method of claim 9, further comprising estimating a phase winding temperature based on the determined phase winding resistance value.

11. The method of claim 10, further comprising causing a preventative action to be performed based on at least one of a measured temperature or an estimated temperature, where the measured temperature corresponds to the phase transistor temperature and the estimated temperature corresponds to the phase winding temperature.

12. The method of claim 8, further comprising receiving, from the thermal sensor, a signal indicating a phase winding temperature; estimating, for each respective phase resistance, the phase winding resistance value based on the signal; and determining the phase transistor resistance value based on the estimated phase winding resistance value.

13. The method of claim 12, further comprising estimating a phase transistor temperature based on the determined phase transistor resistance value.

14. The method of claim 13, further comprising causing a preventative action to be performed based on at least one of a measured temperature or an estimated temperature, where the measured temperature is the phase winding temperature and the estimated temperature is the phase transistor temperature.

15. An electronic power steering (EPS) system comprising:
a synchronous motor controlled by a synchronous motor drive;
a processor; and
a memory that includes instructions that, when executed by the processor, cause the processor to:
receive a command voltage signal;
identify, in the synchronous motor drive, a resistance imbalance signature from the command voltage signal by demodulating a pulsating portion of the command voltage signal;
estimate one or more phase resistance values for each phase of a synchronous motor drive based on the resistance imbalance signature and a phase transistor temperature from a thermal sensor, wherein the estimated one or more phase resistance values of the synchronous motor drive include a phase transistor resistance value and a phase winding resistance value;

calculate an estimated phase transistor resistance value for each respective estimated phase resistance value of the estimated one or more phase resistance values based on the phase transistor temperature;

determine a phase winding resistance value for each respective phase of the synchronous motor drive based on a respective estimated phase transistor resistance value;

estimate an average resistance between the phases of the synchronous motor drive based on each respective phase winding resistance value, an average transistor temperature estimate, and an average phase winding temperature estimate; and identify, based on each respective phase winding resistance value and the estimated average resistance between the phases of the synchronous motor drive, one or more phases of the synchronous motor drive associated with a resistance imbalance.

16. The EPS system of claim 15, wherein the instructions further cause the processor to estimate a phase winding temperature based on the determined phase winding resistance value.

17. The EPS system of claim 16, wherein the instructions further cause the processor to cause a preventative action to be performed based on at least one of a measured temperature or an estimated temperature, where the measured temperature corresponds to the phase transistor temperature and the estimated temperature corresponds to the phase winding temperature.

18. The EPS system of claim 17, wherein the instructions further cause the processor to receive, from the thermal sensor, a signal indicating the phase winding temperature; estimate, for each respective phase resistance, the phase winding resistance value based on the signal; and determine the phase transistor resistance value based on the estimated phase winding resistance value.

19. The EPS system of claim 18, wherein the instructions further cause the processor to estimate the one or more phase resistance values for each phase of the synchronous motor drive further based on at least one of a speed of the synchronous motor, a current output by the synchronous motor, a current magnitude associated with the synchronous motor, a resistance of a phase of the synchronous motor, a resistance magnitude associated with the synchronous motor, and a voltage magnitude associated with the synchronous motor.

* * * * *